Aug. 20, 1957   A. F. A. BARTELS ET AL   2,803,035
CHARGING DEVICE FOR FISH PROCESSING APPARATUS
Filed July 23, 1953   4 Sheets-Sheet 1

Inventors
A. F. A. BARTELS and
P. F. W. JOBMANN
By
Richards & Geier
Attorneys

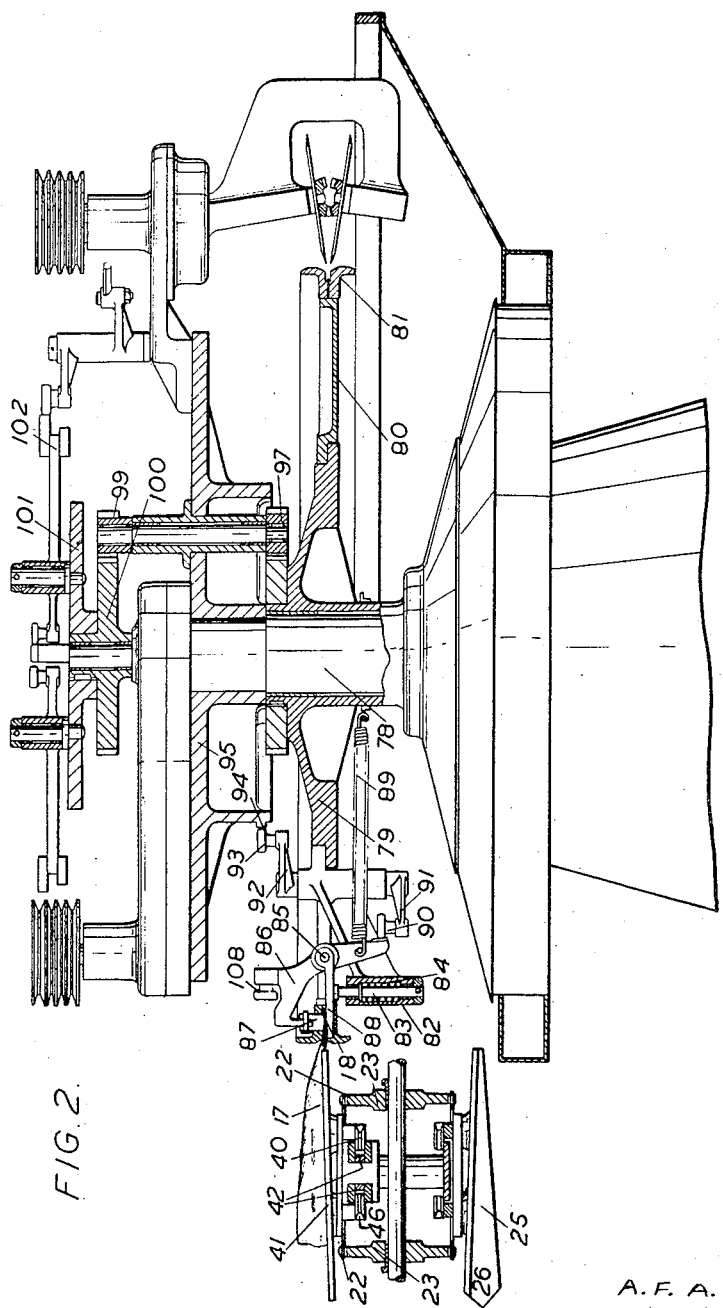

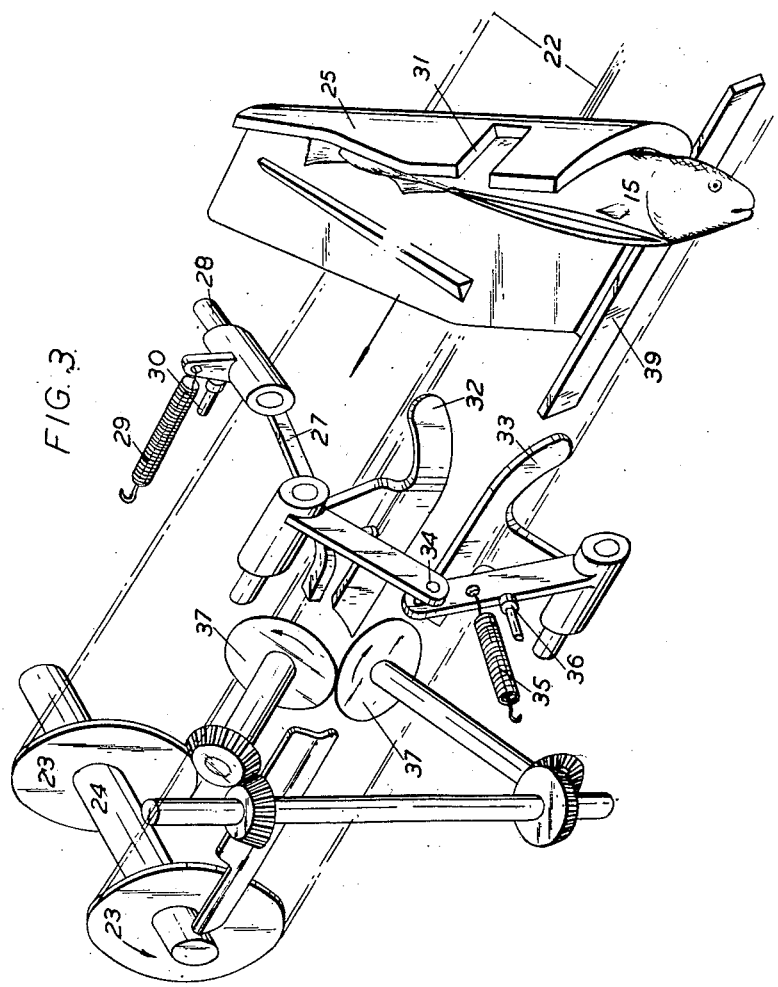

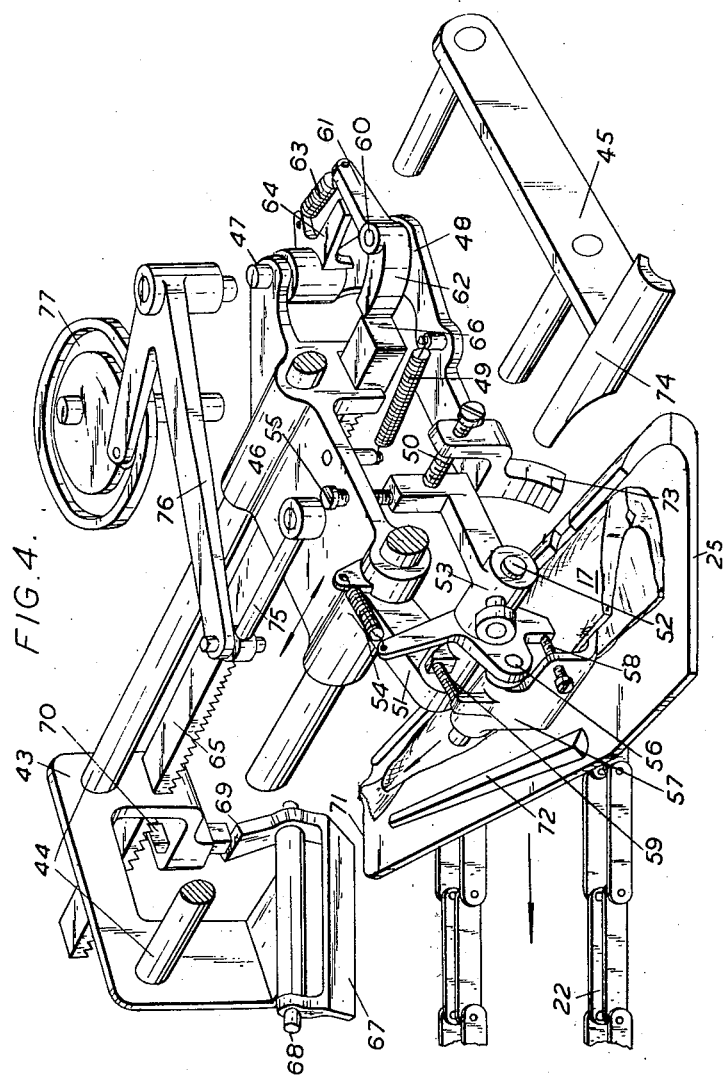

United States Patent Office 2,803,035
Patented Aug. 20, 1957

2,803,035

CHARGING DEVICE FOR FISH PROCESSING APPARATUS

Alfred Friedrich Adolf Bartels and Paul Friedrich Wilhelm Jobmann, Lubeck, Germany, assignors to Nordischer Maschinenbau Rud. Baader, Lubeck, Germany Application July 23, 1953, Serial No. 380,204

Claims priority, application Germany January 21, 1953

1 Claim. (Cl. 17—4)

This invention relates to a fish processing apparatus and more particularly to a charging device for the main processing device.

Various types of fish processing apparatus are known but their chief difficulties arise in the preliminary or charging means such as severing the heads and the caudal fins prior to the introduction of the fish into the main processing device. Naturally, these steps can be taken in separate devices but then there is no automatic total operation.

It is an object of the instant invention to combine the charging and final operations in one device.

Other objects of the instant invention will become apparent in the course of the following specifications.

In the attainment of these objectives, the fish are arranged in a transverse position on a carrier of the charging device. Gill guides make it possible to sever the heads of the fish in the most favorable position. A support reaching into the abdominal cavity of the fish moves the fish longitudinally onto the conveyor of the device of the main operation. The direction of movement of the conveyor in the charging and final processing operation is immaterial, that is both may have a circular movement or both a straight line movement or one a straight line and the other a circular movement. It is only necessary that the direction of movement of the two conveyors be the same at the moment of transfer.

The invention will be more readily understood from the following detailed description when taken in conjunction with the accompanying drawings showing by way of example a preferred embodiment of the inventive concept.

In the drawings:

Figure 2 is an elevational view in part sections of the devices shown in Figure 1 on an enlarged scale;

Figure 3 is an enlarged perspective view of the head severing device shown in Figure 1; and Figure 4 is an enlarged perspective view of the device for moving the fish from the charging device into the final processing device.

Figure 1:
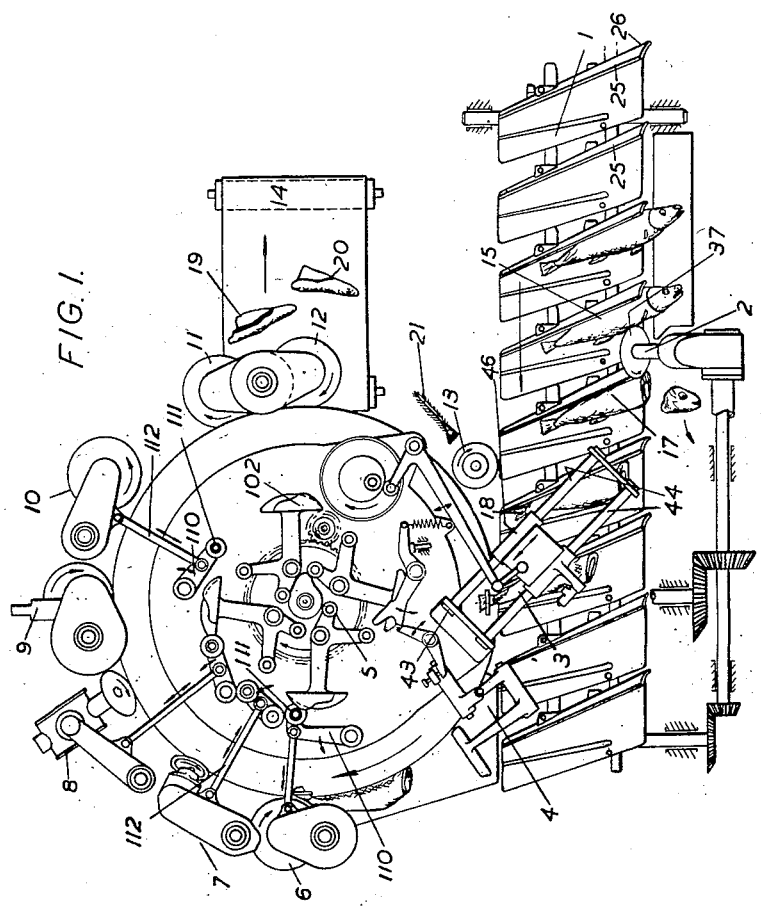
Figure 1 is a schematic view of the charging and main processing devices constructed in accordance with the principles of this invention.

Referring now in greater detail to the drawings where like reference numerals indicate like parts, 1 indicates the charging device, 2 the head severing device, and 3 the device for moving the fish into the final processing device.

The final processing device has a measuring device 4 by means of which the multiple cam sets of the control wheel 5 are adjusted for each fish. A set of fillet cutting knives is shown at 6, a cutter for the belly lobes at 7, a rib knife head at 8, a pair of boning knives at 9, a belly cleaning tool at 10, two fin separating knives at 11 and 12, a cleaning brush at 13, and a fillet removing belt at 14. There are also conveying and guiding devices for the fish as well as suitable means for driving and controlling the tools at the cams of the control wheel, and for catching and removing waste material. Carrying, connecting, and protecting devices for simplicity are not shown.

The fish 15 is introduced into the device, and after the removal of the head it remains as the body 17, while the head passes to a discharge belt. Caught by the caudal fin 18 (Fig. 2), the fish is passed through the various cutting mechanisms of the final processing device until it leaves the machine as fillets 19 and 20 on the fillet removal belt 14 while the bones 21 with the other waste leave the machine on a waste removal belt.

In the charging device is a conveyor constituted of two open link chains 22 forming endless bands running over sprocket wheels 23 attached to shafts 24 supported in the machine frame. One of the two shafts is illustrated in the drawing. The two chains are connected by slides 41 (Fig. 2) which by means of a pair of sliding blocks or shoes 40 assure exact guidance in two guide bars 42 attached to the machine frame and which carry the removal tray-like fish troughs 25 (Fig. 1). Of course, the length of the troughs is greater than that of the fillet of the largest fish to be processed. The edge of the fish in the trough is located transversely to the direction of movement of the fish during the head severing operation. The fish is placed with its back into one of the troughs and forced into the curvature of the trough by a pressing finger 27 (Fig. 3) loaded by means of a spring 29 shortly before reaching the head severing device 2 at which time the finger slides through a slot 31.

The fish are so placed in the troughs 25 that the belly points in the direction of movement of the conveyor chain. The gill is pulled against the gill guide bar 72 connected to the device close to the edge 26 of the trough. A guide 39 is located close to the open front end of the trough 25 and extends in the direction of movement of the trough toward the cutting device. The guide 39 assists in maintaining the position of the fish 15 in the trough 25. In front of angularly disposed rotary circular knives 37, and arranged at an angle to each other are two synchronized guides 32 and 33 rotatably supported on pins firmly connected to the device so that the fish reaches the knives at the correct height. The result is a fish free from the skull bone and the gills with a minimum of flesh lost.

After the head severing operation, the headless fish is moved by the abdominal gripping device 57 (Fig. 4) in the direction of the caudal fin until the latter is over the side edge 71 of the trough 25 and can be grasped by the tail clamp which passes over the trough.

A bridge 43 (Fig. 4) is rigidly attached to the device and carries two horizontal columns 44 which at their free ends are connected by a yoke 45. Movably guided on the columns is a slide 46 carrying a pulling rod 75; the slide 46 is actuated by means of the double lever 76 which is connected to the rod 75 and which is moved by the periodically rotating channel curve 77. The slide 46 carries an arm 51 which, by means of a belt 52, carries the pawl lever 53 which, in turn, carries on the pin 56 the abdominal cavity gripping device 57 and, by means of the spring 59 forces it against the stop 58 and into the abdominal cavity of the fish. The fish was cut and the abdominal cavity formed before it was introduced into the machine. This spring 59 makes it possible for the abdominal cavity gripping device in the case of large fish to yield in accordance with the height of the back. The lever 48 which is rotatably mounted upon the pin 47 attached to the slide 46, is turned by the action of the spring 49 which is connected therewith, until the stop screw 50 is resting against the stop 53. The lever 48 carries a pin 60; a releasing lever 62 is mounted upon the pin 60 and has a leg 61 connected to a spring 63 and resting against the stop 64 while the other end of the lever 62 is in contact with the end 66 of the toothed rack 65 displaceably supported in the slide 46. Upon the forward movement of the slide 46, the fish by means of the abdominal cavity device 57 which is movable along with the slide 46, is pushed in the direction toward its tail so that its caudal fin starts to protrude beyond the edge 71 of the trough 25. At the same time, however, the somewhat thicker base of the tail of the fish lifts the measuring shoe 67, swingable around the bridge 43 by the pin 68 and this swinging causes the pawl 70, at the end of the lever 69, to be lifted against the rack. Upon reaching the adjusted value, the pawl 70 stops the rack 65. Upon the continued sliding of the slide 46, the lever 62 presses against the contact surface 66 of the rack thereby forcing the arresting lever 48 to swing away from its stop 53 which it engaged by means of the screw 50, until the pawl lever 53 is no longer lifted by the arresting lever 48 but is swung out under the effect of the tension spring 54 thereby swinging the abdominal cavity gripping device 57 out of the abdominal cavity of the fish. At the end of the return of the slide into its initial position, the fish has left the range of action of the charging device. Thereafter, the pawl lever 53 is lifted by the arresting lever 48 which strikes with its projection 73 the stop 74 so that the introducing process can take place again.

The fish brought into the correct position for the main processing device is caught by the tail clamp of the carrier disc. The disc 79 is rotatably supported on the column 78 rigidly attached to the machine and is driven in synchronism with the charging device. To the carrier disc are attached a number of segments 80 which carry one tail clamp each and the stops 81. Each segment 80, in a hub 82, displaceable against the action of a spring 84 but not swingable, carries the lower part of the tail clamp with the tail support 88. In its two hubs, by means of pins 85, is supported the tail hammer 86 which carries the hammer head 87 forcing it against the support 88 by action of the springs 89. Such yielding attachment is necessary for adaptation to the fin in the tail clamp. Before introducing the fish tail into the tail clamp, the latter naturally must be opened and closed at the moment the caudal fin is in the correction position in the tail clamp. By passing the roller 93 over a cam of the curve 94 there takes place a turning of the lever 92 which, across the lever 91 and the roller 90, causes an opening of the tail clamp.

The drive of the control wheel 101 across the spur wheels 97, 99, and 100 takes place in such a manner that each cam set 102 assigned to a fish reaches the tools at the same time with the tail clamp. The stops 81 are so positioned that they are capable of supporting the back of the fish during processing and in addition are provided with at least one annular groove located closed beside the symmetry plane of the fish into which groove enter the fin separating circular knives. In order to prevent damage to the circular knives, grooves may be provided in the hammer head 87. The tools are actuated by the roller lever 110, the roller 111, and the pushing rod 112 against the action of springs.

While only one embodiment of the charging device has been described and illustrated, other embodiments are possible within the scope of the appended claim.

What is claimed is:

A charging device in a fish processing apparatus, the charging device comprising a conveyor, a plurality of troughs disposed on the conveyor in transverse spaced arrangement, a separate gill guide bar carried by each trough, a gripping device disposed above the conveyor and cooperating therewith for engaging a fish located upon one of said troughs, means connected with the gripping device for moving it until the caudal fin of said fish is over one edge of the trough, locking means connected with the gripping device for the releasing thereof by the caudal fin of said fish, means cooperating with said conveyor for engaging the caudal fin, and means connected with the gripping device for returning the gripping device to the original position thereof.

References Cited in the file of this patent

UNITED STATES PATENTS

| | | |
|---|---|---|
| 2,227,346 | Holm | Dec. 31, 1940 |
| 2,502,175 | Savrda | Mar. 28, 1950 |
| 2,540,990 | Oss | Feb. 6, 1951 |
| 2,630,208 | Oates | Mar. 3, 1953 |
| 2,683,281 | Yanus et al. | July 13, 1954 |
| 2,724,483 | Rose et al. | Nov. 22, 1955 |

FOREIGN PATENTS

| | | |
|---|---|---|
| 63,957 | Norway | Sept. 22, 1941 |
| 676,814 | Great Britain | Aug. 6, 1952 |